United States Patent [19]

Pepe

[11] Patent Number: 4,977,411
[45] Date of Patent: Dec. 11, 1990

[54] ELECTRONIC COLOR PRINTING SYSTEM

[75] Inventor: Martin J. Pepe, West Henrietta, N.Y.

[73] Assignee: Xerox Corporation, Stamford, Conn.

[21] Appl. No.: 432,012

[22] Filed: Nov. 6, 1989

[51] Int. Cl.⁵ .................. G01D 15/16; H04N 1/46
[52] U.S. Cl. .............................. 346/108; 355/202; 358/75
[58] Field of Search .............. 346/108, 107 R, 160; 355/202; 358/296, 75

[56] References Cited

U.S. PATENT DOCUMENTS

| | | | |
|---|---|---|---|
| 4,389,659 | 6/1983 | Sprague | 346/153.1 |
| 4,403,848 | 9/1983 | Snelling | 355/4 |
| 4,477,175 | 10/1984 | Snelling | 355/3 |
| 4,912,491 | 3/1990 | Hoshino et al. | 355/202 |
| 4,918,465 | 4/1990 | Morita | 358/75 |
| 4,937,664 | 6/1990 | Chiku et al. | 358/75 |

Primary Examiner—Mark J. Reinhart

[57] ABSTRACT

A line-at-a-time printer is realized by directing a collimated light beam through an interaction area of an electro-optic light modulator while successive sheets of data samples are sequentially applied to electrodes positioned across the width of the modulator. A modulated line latent image is formed on the surface of a photoreceptor, the photoreceptor being indexed to create successive exposed, modulated line images on its surface. Electronic registration control of successive images, for example in a color printing process, is achieved by a control system which triggers the light beam source between the time interval during which data signals are loaded into the modulator. In one embodiment the pulse sourcing is accomplished through a feedback loop which includes a sensor for monitoring movement of the photoreceptor and application of the light source pulses and the data samples.

4 Claims, 2 Drawing Sheets

ELECTRONIC COLOR PRINTING SYSTEM

BACKGROUND AND INFORMATION DISCLOSURE STATEMENT

This invention relates to an electronic color printing system and, more particularly, to a color printing system which utilizes a linear optical image bar to form images with improved registration on a photoreceptor surface.

Electronic color printing systems are known in the art. For example, U.S. Pat. No. 4,403,848, assigned to the same assignee as the present invention, discloses a system which uses a modulated laser ROS (raster output scanner) to form separate exposures at different locations of a photoreceptor belt, each exposure representing a specific color. Each latent image is exposed with a characteristic color toner and transferred sequentially to a copy sheet. This system shown in FIGS. 1 and 2 of the patent can be characterized as a single pass, multiple image system. FIG. 3 of the same patent shows another color printing embodiment wherein three lasers are modulated in accordance with scanned document information and three imaging beams are scanned across the moving charged photoreceptor creating three color separation images which are developed in succession to form a composite color image. This color image is thereafter transferred to a copy sheet and fused to provide a color copy. For each of the two embodiments disclosed in this patent, the color images are formed by directing the modulated laser output to the surfaces of a rotating polygon which then reflects (scans) the image across the photoreceptor surface. The major problem with this type of prior art color printing system is the difficulty in registering the color images in both the single pass and multiple pass modes. The rotating mass of the polygon presents the main difficulty in maintaining precise registration since it is subject to mechanical speed irregularities and vibration. U.S. Pat. No. 4,370,047 also assigned to the same assignee as the present invention, is directed to a color printing system which utilizes a single pass, multiple image, system. This system is subject to the same type of registration problems discussed above.

Optical image bars, as known in the art, comprise an array of optical picture elements (pixels), for converting a spatial pattern, usually represented by the information content of electrical input data signals, into a corresponding optical intensity profile. Although there are a variety of applications for these image bars in a number of different fields, a significant portion of the effort and expense that have been directed to their development has been directed towards their application to electrophotographic printing where they are relatively low cost, and a reliable alternative to the flying spot raster scanners of the type disclosed in the above discussed patents. The optical image bar generates line-like image ray patterns, representative of the image signal input, on the surface of a photoreceptor. One example of an image bar type of printer is found in U.S. Pat. No. 4,477,175, where the image bar is composed of a plurality of individually activated illumination elements (LEDs). Another example is found in U.S. Pat. No. 4,389,659 where the image bar is composed of a plurality of individually activated electro-optic electrodes. Also known as an EO TIR (electro-optic total internal reflection) spatial light monitor, this type of device characteristically comprises a plurality of laterally separated, individually addressable electrodes which are maintained on, or closely adjacent to, a reflective surface of an optically transparent electro-optic element, such as a lithium niobate ($LiNbO_3$) crystal. In operation, substantially the full width of the electro-optic element of such a modulator is illuminated by a linearly polarized, transversely collimated light beam. Thus, when voltages representing the pixels of a linear pixel pattern (e.g., the pixels for a given line of an image) are applied to its individually addressable electrodes, the modulator spatially phase modulates the wavefront of the light beam in accordance with the applied pixel pattern. As a general rule, of course, the spatial wavefront modulation varies as a function of time in accordance with the pixel patterns for successive lines of a two dimensional image, thereby providing a line-by-line representation of the image.

According to one aspect of the present invention, a plurality of optical image bars are used in a single pass multiple image color printing system where individual laser sources are simultaneously pulsed in a timed relationship with input data modulation to form line exposures at separate photoreceptors which are in exact registration with each other. As a further aspect of the present invention, the delayed laser trigger pulses are generated in time intervals between each successive line exposure thus enabling high speed operation. The concept is equally valid to multiple pass, single image systems with the delayed pulse being simultaneously applied as two or more laser pulses coincident with data input modulation. More particularly, the invention rleates to a printer comprising an image writing section for forming line images on the surface of a photosensitive medium located in a xerographic processing section, the image writing section including at least one light source for emitting beams of output radiation of a first duration upon application of a strobe pulse thereto; modulator means in the path of said output radiation for directing a modulated light beam signal to said photoreceptor medium; means for applying data signals to said modulator, the application of said data signals being separated by a time period of a second duration, said radiation output of first duration being narrow in width compared to the time period of said second duration, and control means for controlling the application of said strobe pulses to said light source, the application occurring during said second time duration.

DESCRIPTION OF THE INVENTION

Figure 1:
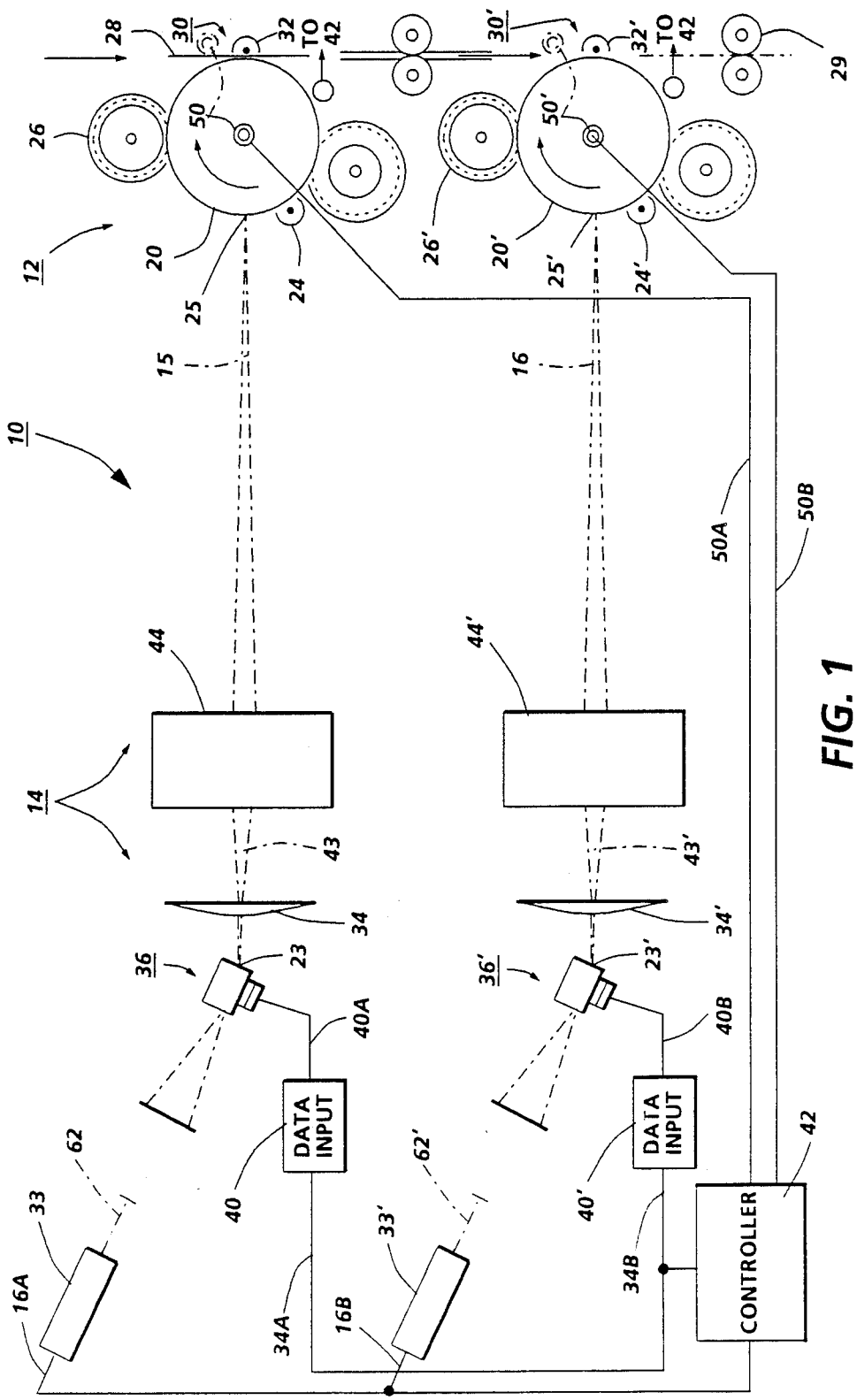
FIG. 1 is a plan side view of a first embodiment of the present invention utilizing a plurality of line imageforming systems in conjunction with a plurality of photoreceptors.

FIG. 1 shows a first embodiment of a multi-color printer 10. Printer 10 includes a xerographic processing section 12, and an image writing section 14, the latter serving to direct at least two high intensity imaging beams of electromagnetic radiation 15, 16 across photoreceptors 20, 20'. The exposed lines form latent images on the photoreceptor which are developed with two different color developers, transferred to a copy medium and fused to provide a dual output color image. It will be understood that more than 2 processing/writing sections could be used, the present two being convenient for illustrative purposes. Furthermore, it is understood that a photoreceptor 'belt' architecture with single and multiple exposure and developer stations could also be used.

Xerographic processing section 12, include photoreceptor 20, 20' rotatably mounted in fixed, predetermined positions and driven by suitable drive motors (not shown) in the indicated direction. A corona charging device 24, 24' is arranged to place a suitable charge on the photoconductor surface of drums 20, 20'. Downstream from the exposure zone 25, 25' color developers 26, 26', shown here as magnetic brush rollers, are disposed in operative contact with the photoreceptor surface. Each developer includes a suitable housing (not shown) which contains a supply of an appropriate colored toner. Following development of the latent electrostatic image created on the photoreceptors, the developed image is transferred to a suitable copy substrate material 28 such as paper at transfer stations 30, 30'. To facilitate transfer, a transfer corotron (32, 32') may be provided to attract the developed image on the photoreceptor to copy substrate material 28. Following transfer, the developed image is fixed as by a fuser roller pair 29.

Image writing section 14 includes a pair of high intensity laser radiation sources exemplified by lasers 33, 33'. The laser outputs are collimated and transmitted through the output faces of TIR modulators 36, 36'. The TIR modulators comprise an electro-optic substrate having a plurality of individually addressed electrodes formed therein. The substrate is typically a Y cut crystal such as $LiNbO_3$ having an internal polished light reflecting surface. The electrodes are intimately coupled to the electrooptic substrate adjacent the reflecting surface and are distributed across essentially the full width of substrate in parallel paired relationship.

Modulation signals (data input) are presented to the modulators 36, 36' by a data input circuit 40, 40'. The operation of the data input circuits, in conjunction with the pulsing of lasers 33, 33' are controlled by controller 42 as discussed in further detail below. The modulated output beams 43, 43' are further shaped by a Schlieren control optical circuit 44, 44' whose operation is described in U.S. Pat. No. 4,492,435, the contents of which are hereby incorporated by reference. The function of circuit 44, 44' is to convert the spatial face front modulation of modulated light beams 43, 43' into a correspondingly modulated intensity profile.

Figure 2:
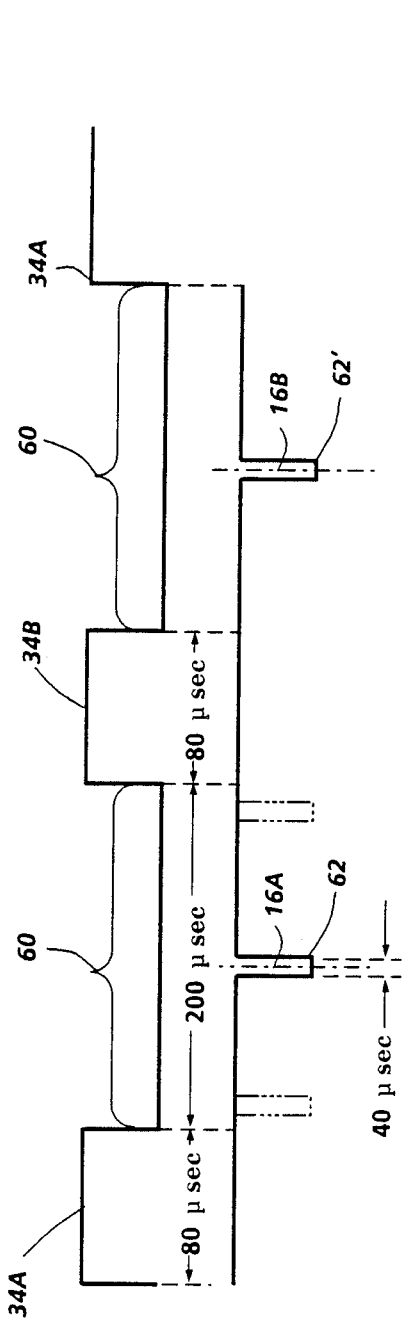
FIG. 2 is a representation of an oscilloscope plot showing the relationship between data loading pulses, exposure window between the loading pulses, and the light source strobe pulses.

The operation of the printer will now be described. It will be assumed that input signals 40A, 40B are each associated with separate colors; e.g. red and yellow. Successive input data signal sets 34A, 34B are sequentially applied to modulators 36, 36', the control sequence being maintained by a clock circuit in controller 42 (the modulator could also be loaded simultaneously if desired, for example, in a non-color print system). Each data signal set contains the information representing the line to be formed at each drum 20, 20'. Controller 42 also provides a strobe energy (pulse) to laser sources 33, 33' at some period of time along the exposure "window" between each input data signal to the respective modulator. According to an important aspect of the present invention each strobe laser emits an output pulse which is of relatively short duration compared to the time duration of the data signal of the exposure window. FIG. 2 shows a representation of a oscilloscope plot to illustrate the relationship between the data signal inputs, the exposure window, and the laser output pulse. It is assumed that the print system will produce output prints having a resolution of 600 spots per inch (spi) with a process speed of 6 inches per second (ips). Data loading signals 34A, 34B are 80 $\mu$sec with a window 60 between the signals of 200 $\mu$sec. This window provides the time interval during which exposure can occur. The controller 42 then generates the laser trigger signals 16A, 16B at some point along the exposure window causing the laser to produce output pulses 62, 62' of 40 $\mu$sec. duration. For this example 160 $\mu$sec. of exposure window are still available to select a precise laser trigger point to ensure exact registration of the exposed lines at the drum surface. Although the exposure is shown as occurring at the midpoint window, it could occur at any point along the width as represented by the dotted location of pulses 62 at the extreme ends.

Continuing with the system description in FIG. 1, as each laser is strobed, pulses 62, 62' are sequentially applied across modulators 36, 36', respectively. The light reflected from the modulators is transmitted as a modulated linear beam of light to the exposure points at each photoreceptor drum. The lines are formed in a very short time period (40 $\mu$sec for this example) and are perfectly registered on each drum surface. The drum is then rotated or indexed by means (not shown) to a new position for receiving the next modulated light beam from the beam shaping circuits 44, 44'. During the interval that the drums are being indexed, the next data input signals are being loaded into the modulators resulting in no loss to throughput.

According to a still further aspect of the invention, even more precise control of the position of the trigger signal 16A, 16B to the laser source can be generated by use of encoders 50, 50' placed adjacent to the drum surface edge. The encoders, which may be optical, magnetic, or equivalent, detect the position of a calibrated pattern on the drum surface, and produce output signals 50A and 50B (FIG. 1) which are adjusted for system timing by the controller and which generate the delayed pulse signals 16A, 16B to the lasers. As an alternative to encoders 50A, 50B detecting the photoreceptor motion, the encoders may be positioned adjacent the paper path sensing, for example, a control patch on the paper.

Continuing with the operational description, as successive modulated laser images are applied to the photoreceptor, a latent image is formed at drum 20, which is developed by, for example, red toner in developer 26 and transferred to output sheet 30. Similarly, a latent image is developed at drum 20' by, for example, yellow developer in developer 26'. Copy sheet 30 is moved past the transfer station so as to have both colors transferred to its surface in registration. The output copy with the two color images transferred thereto passes through the fuser station and emerges as a two color sheet.

Figure 3:
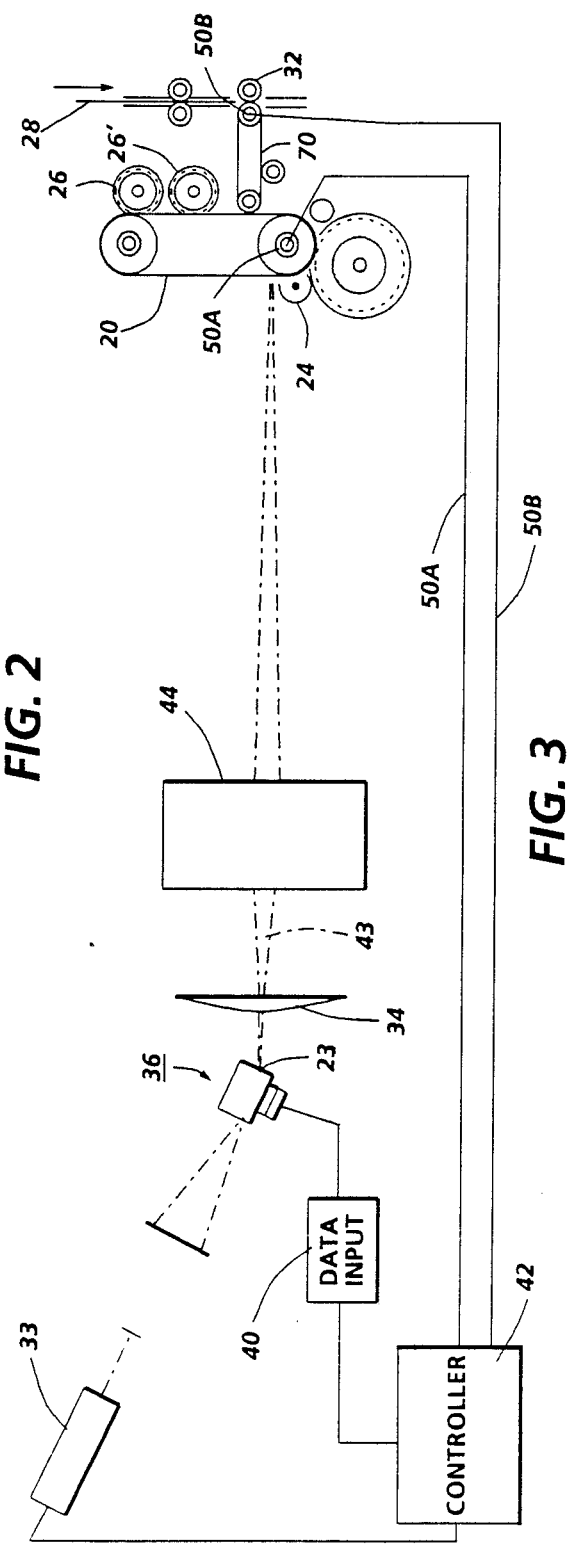
FIG. 3 is a side plan view of a second embodiment of the present invention illustrating a single line, imageforming system.

A second embodiment of the invention is shown in FIG. 3. There, only a single imaging xerographic system utilizing a photoreceptor belt 20 is shown. The system operates much like that of the system in FIG. 1, except that a transfer belt 70 must be used to transfer successive color images to the output medium. Encoders 50A, 50B are positioned so as to track both the position of the photoreceptor (50A) and the latent image (50B) for each development station 26, 26', respectively. The outputs from the encoders are sent to the controller 42 wherein suitable gating circuits generate the signal after the appropriate time in the exposure window thus allowing little or no misregistration of each color for a given composite overlay line from the previous color.

While the invention as set forth has been described with reference to the structure disclosed, it is not confined to the details set forth. For example, the imaging beam 15, 16 could be formed by light emitting diodes (LED) bars, or PZT bars. It is intended that such modifications or changes will be within the scope of the following claims:

What is claimed is:

1. A printer comprising an image writing section for forming line images on the surface of a photosensitive medium located in a xerographic processing section, the image writing section including at least one light source for emitting beams of output radiation of a first duration upon application of a strobe pulse thereto; modulator means in the path of said output radiation for directing a modulated light beam signal to said photoreceptor medium; means for applying data signals to said modulator, the application of said data signals being separated by a time period of a second duration, said radiation output of first duration being narrow in width compared to the time period of said second duration, and control means for controlling the application of said strobe pulses to said light source, the application occurring during said second time duration.

2. The printer of claim 1, further including encoder means for detecting the physical position of the images formed in the processing section, said encoder means generating signals which are sent to said control means and used to control application of said strobe pulse to said light source.

3. The printer of claim 1, wherein said encoding means detects movement of said photosensitive medium.

4. The printer of claim 1, wherein said xerographic processing section further includes developing means for developing said exposed line images and transfer means for transferring developed images to an output medium.

* * * * *